INVENTORS
H. F. KESTER
P. R. WOOLLETT
BY Young & Quigg
ATTORNEYS

United States Patent Office 3,401,020
Patented Sept. 10, 1968

3,401,020
PROCESS AND APPARATUS FOR THE
PRODUCTION OF CARBON BLACK
Harry F. Kester and Paul R. Woollett, Orange, Tex., assignors to Phillips Petroleum Company, a corporation of Delaware
Filed Nov. 25, 1964, Ser. No. 413,792
5 Claims. (Cl. 23—209.4)

ABSTRACT OF THE DISCLOSURE

The present invention lies in the discovery that a regulated partial quench can permit the carbon black modulus reducing reaction to proceed at a reduced rate, whereas the prior art believed the position of the first quench set the modulus. In a process and a system for producing carbon black, comprising pyrolyzing a hydrocarbon in the presence of a free oxygen-containing gas to produce smoke of a carbon black that if unquenched would have a lower modulus than desired, and which smoke has a temperature high enough to maintain a reaction causing a lowering of this modulus with time, passing said smoke downstream through said system and quenching the same, the improvement comprising partially quenching said reaction in said smoke with a cooling fluid at a first point in said system to the degree necessary to slow said reaction down to the extent necessary to produce a carbon black of the desired predetermined modulus if said reaction is completely quenched when it sometime later reaches a second point in said system spaced downstream of said first point, and completely quenching said smoke with a cooling fluid at said second point to a temperature at which said reaction will not substantially further change the modulus of the produced carbon black below a predetermined desired modulus. Empirical tests of the modulus produced versus the water rate to the first quench can be run to discover the water rate to the first quench necessary to maintain the desired modulus.

---

Figure 1:
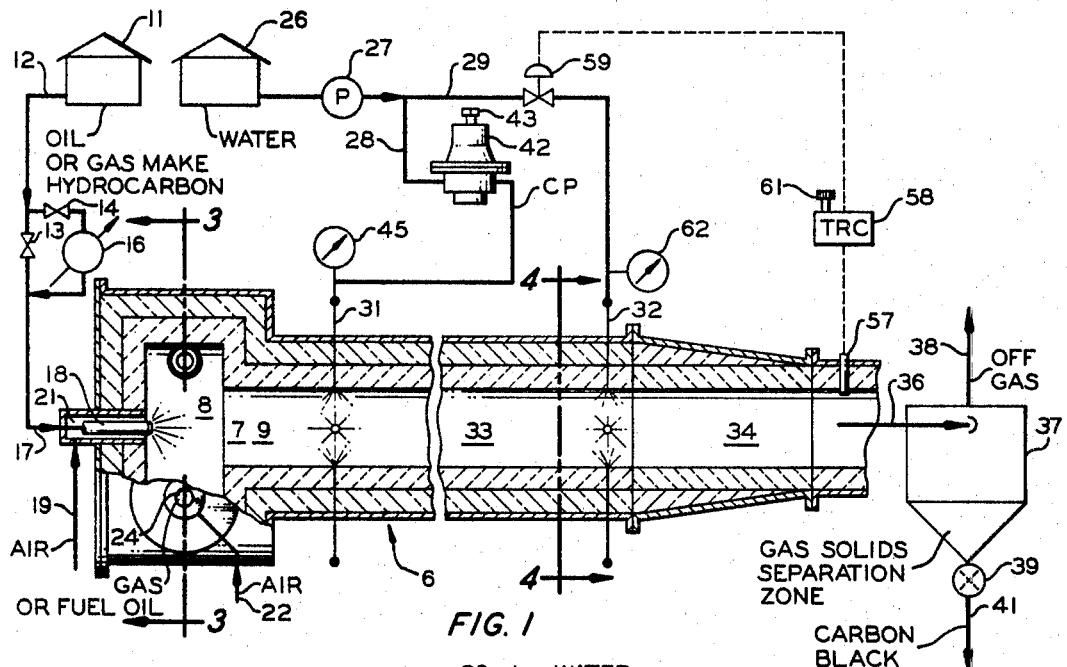

This invention relates to a process and apparatus for controlling the water flow rates to a plurality of water spray quenches positioned in series in the effluent smoke from a carbon black furnace in order to thereby control the modulus of rubber compounds containing the carbon black product of said furnace. In another aspect, it relates to a process and apparatus in which a carbon black furnace has a primary water spray quench and a secondary water spray quench, and in which water is supplied at a selected predetermined constant rate of flow to said primary quench, while the rate of flow of water to said secondary quench is regulated to maintain a predetermined constant temperature in the smoke at a point downstream of said secondary quench. In another aspect, it relates to a process and apparatus for making carbon black having regulated desirable properties in a furnace by regulating primary and secondary water spray quenches.

In the prior art of making carbon black for use as a filler and reinforcing agent in rubber recipes, the uniformity of the 15-minute and 30-minute modulus imparted to the rubber product by the carbon black is regarded as important. However, it has proved difficult to maintain a uniform 15- and 30-minute modulus because of numerous known and unknown factors. If the oil quality, such as its Bureau of Mines Correlation Index (BMCI), varies, so does the modulus, and it is suspected that atmospheric barometric pressure variations, atmospheric humidity variations, and other unidentified and often uncontrollable but slowly shifting factors all have some effect on the modulus.

The present invention is the discovery that while many different factors may vary the 15-minute and 30-minute modulus of the carbon black, the desired modulus may be maintained at any desired selected level by periodically testing the modulus of the carbon black produced and then adjusting the water supply to a primary water spray quench in the furnace to a selected predetermined constant rate of flow, while a secondary quench is operated to bring the temperature of the effluent carbon black smoke down to a uniform temperature below the temperature at which substantial amounts of further chemical reaction would occur. A substantial distance is provided between the primary and secondary quenches to provide an after-treating zone in which the more or less partially quenched carbon black in the effluent smoke may partially react further to the desired degree necessary to adjust the modulus to the desired selected level.

It has been found that when using enough water in both quenches to lower the temperature of the effluent smoke from above about 2400° F. to below about 1700° F. and preferably to about 1600° F., with about half of the water originally going to the primary quench and with the remainder going to the secondary quench, that in a 12-inch diameter reaction section furnace with the primary and secondary quenches about 5 to 10 feet apart an increase of one gallon per minute in the water to the primary quench will raise the 15-minute modulus by about 40 pounds per square inch, will raise the 30-minute modulus by about 14 pounds per square inch, and will raise the abrasion index by only about 1 percent, while the nitrogen surface area will be decreased by only less than about one-half of 1 percent.

One object of the present invention is to provide a process, and apparatus for carrying out said process, whereby the 15- and 30-minute modulus of carbon black produced in a furnace may be adjusted up or down to a preselected desired uniform value, without substantially changing the abrasion resistance or the nitrogen surface area of said carbon black.

Another object is to provide a carbon black furnace having two quenches with a substantial partial reaction zone therebetween, in which water is fed to the first quench at a uniform regulated rate and to the second quench in an amount necessary to quench the effluent smoke from the furnace to a preselected uniform temperature.

Another object is to provide an improved furnace process, furnace apparatus, quench process and quench apparatus.

Another object is to produce an improved carbon black of uniform modulus, regardless of changes in the oil, atmospheric changes, and other unknown factors tending to gradually change the modulus.

Numerous other objects and advantages will be apparent to those skilled in the art upon reading the accompanying specification, claims and drawings.

Figure 4:
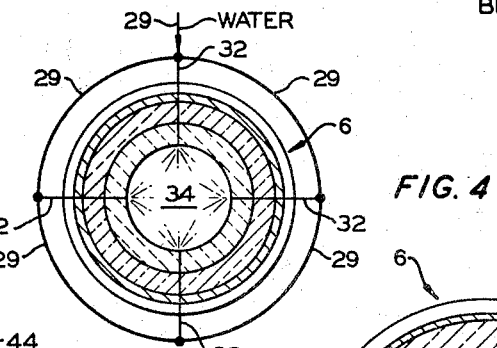
Figures 2, 3:
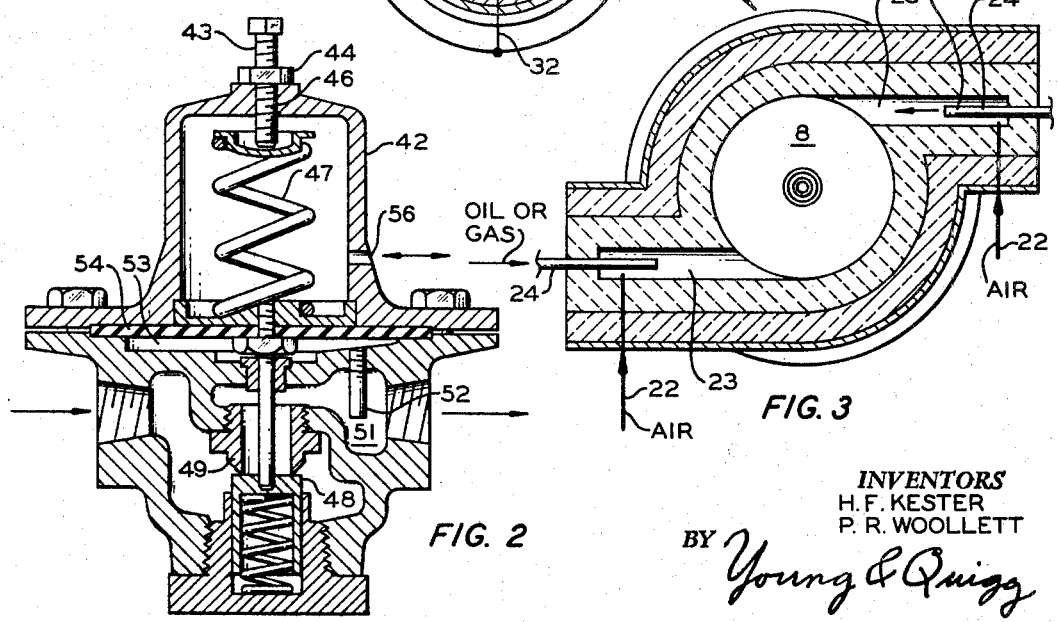

In the drawings:
FIGURE 1 is an elevational schematic view, with parts broken away and in cross section, showing a carbon black furnace and manufacturing plant embodying the present invention.
FIGURE 2 is a enlarged cross-sectional view of the constant-pressure downstream control valve shown in FIGURE 1.
FIGURE 3 is a cross section of the furnace shown in FIGURE 1 taken along the line 3—3 looking in the direction indicated.
FIGURE 4 is a cross section of the furnace shown in FIGURE 1 taken along the line 4—4 looking in the direction indicated.

In describing and claiming this process it is conventional to speak of the 15- and 30-minute modulus, the abrasion resistance index, and the nitrogen surface area of the carbon black, whereas what is really referred to is the modulus or abrasion resistance of test rubber samples in which a uniform amount of said carbon black has been incorporated as a filler or reinforcement agent and the amount of nitrogen that is adsorbed by the carbon black in a complicated but standard conventional test, respectively. If necessary, we can refer to many prior patents and prior publications giving minute instruction on exactly how to mix standard rubber samples and make these conventional standard tests, but we believe it unnecessary to do so in this application.

While the furnace generally designated as 6 in FIGURE 1 is the same general type as that shown in Pollock 2,785,964 of Mar. 19, 1957, it should be understood that the present invention can be used equally well in any other conventional carbon black furnace in which carbon black is made by pyrolysis and/or incomplete combustion of hydrocarbons; for example, as in Williams 2,971,822 of Feb. 14, 1961. While both patents cited show a plurality of water spray quenches in series, with a quench zone of substantial length between them, there is no suggestion in either patent of the present invention of regulating the amounts of water going to a primary and a secondary quench respectively, so that there is a reaction zone of substantial length between the two quenches for a continued reaction at a reduced reaction rate, in order to control the modulus of the carbon black.

Furnace 6 may comprise a generally cylindrical combustion and reaction zone 7 which may be of a single diameter (not shown), or which may be formed with an enlarged diameter combustion section 8 and a reduced diameter reaction section 9 as shown. A carbon black make hydrocarbon in either gaseous, vaporous or sprayed liquid form is subjected to pyrolysis and/or partial combustion with a free oxygen-containing gas, such as air, in chamber 7, and the manner of introduction of the hydrocarbon and free oxygen is immaterial. As shown, however, it is preferred to take the liquid hydrocarbon or hydrocarbon gas from tank 11 through line 12, valves 13 and/or 14, preheater and partial or total vaporizer 16, line 17, and spray it out of nozzle 18 axially of chamber 7.

While not essential to operability of the invention, it is generally desirable to inject some air, nitrogen, hydrogen, methane, combustion gas, or other inert gas through line 19 and annulus 21 in the form of an annular sheath around nozzle 18 to prevent carbon deposits which otherwise would tend to build up on nozzle 18 and the walls of annulus 21.

A free oxygen-containing gas, such as air, is preferably introduced through pipe 22 and the tunnel 23 into combustion section 8, best shown in FIGURE 3, to burn either a portion of the make hydrocarbon from nozzle 18 or to burn with a liquid or gaseous fuel introduced through pipes 24.

While any hydrocarbon gas, oil or mixture can be used in nozzle 18 as make hydrocarbon and in pipes 24 as fuel, it is preferable that the hydrocarbon in nozzle 18 have a fairly high Bureau of Mines Correlation Index (known as BMCI) for efficiency, the fuel in pipe 24 being any fuel oil, or natural gas, or methane.

In the present invention, water from a supply such as tank 26 under pressure from any source, such as pump 27, is supplied through lines 28 and 29 to water spray quench nozzles 31 and 32, respectively, in reaction section 9 of furnace. 6. For a 12-inch diameter reaction section 9 the primary quench 31 and secondary quench 32 are located from about 5 to 10 feet apart, and the intermediate section 33 of reaction section 9 acts as a zone for reaction at a reduced rate of reaction than occurs upstream of primary quench spray 31, and this reduced rate of reaction depends entirely upon how much quench water is added at primary quench spray 31. For a smaller diameter reaction zone 9 the length of zone 33 would be shorter in direct proportion to the diameter of zone 9; for example, for a 3-inch reaction zone 9, zone 33 would preferably be from about 1 to 3 feet long, and for a 24-inch reaction zone from about 10 to 20 feet long. However, the invention may be practised as long as zone 33 has substantial length allowing for some small residence time of the smoke passing therethrough, such as 0.01 to 10 seconds. Secondary spray quench 32 adds enough water to bring the temperature of the smoke down to below about 1700° F., preferably to about 1600° F., at which no further substantial amount of reaction can occur in chamber section 34 or in line 36 to the conventional gas solids separation zone 37, which may consist of a cyclone separator as shown, or a bag filter (not shown), or any of the combination of cyclones and/or bag filters and/or electrical precipitators shown in the prior art, as in Pollock cited above (not shown here). Further cooling by radiation to the air from pipe 36, or further water quenching (not shown) may be employed in pipe 36 if desired to protect the separation equipment 37, but as the reaction ended at secondary quench spray 32, further cooling is not necessary to the present invention. From separating zone 37 the off gas is taken through line 38 to disposal, or use as fuel gas at 24, or in some external heater (not shown), which might be used to heat feed heater 16 if desired, and the carbon black product passes through star valve 38 into line 41.

In order to supply water at a constant predetermined rate to primary quench sprays 31, it is preferred to employ a conventional constant pressure downstream pressure-reducing regulating valve 42 controlling the rate of flow of water through line 28. This pressure may be checked by pressure gauge 45 if desired, the pressure in line 28 downstream of valve 42 being set by bolt 43 on top of valve 42 in the usual manner. If desired, other known means (not shown) for metering water at a constant predetermined rate to spray 31 may be employed, but valve 42 is so efficient and inexpensive that it is preferred.

Valve 42 is shown in section in FIGURE 2. It is a conventional valve, purchased from any valve manufacturer, so detailed description is unnecessary. Lock nut 44 keeps bolt 43 in adjusted position. Screwing bolt 43 in through threads 46 of valve 42 increases the compression on helical spring 47 tending to move valve head 48 down to open valve seat 49. The pressure downstream of seat 49 in space 51 is transmitted through tube 52 to space 53 below flexible diaphragm 54 to tend to force spring 47 upward and balances the downward force of spring 47 and atmospheric pressure through passage 56. This results in a constant pressure in sprays 31 and therefore a constant rate of flow of water through them.

The rate of flow of water in line 29 varies with the temperature in 34 at thermometer 57 which actuates temperature-recording controller 58 to open motor valve 59 to the degree necessary to keep 57 at a predetermined constant temperature as set by adjustment screw 61. Such controls are well known in the prior art and need no further description. If desired, a pressure gauge 62 will indicate the actual rate of flow of water through sprays 32, as sprays 31 and 32 can be calibrated for such rates of flow under given pressures.

One advantage of using the simple devices shown is to reduce the cost of the installation, and it has been found that this simple system is more reliable than more complicated and sophisticated systems that can be devised to practice the present invention.

FIGURES 3 and 4 are self-explanatory, being cross sections of FIGURE 1 taken along the lines 3—3 and 4—4, respectively, looking in the direction indicated by the arrows. In FIGURE 3 you may see the tunnels 23 disposed tangentially to the outer wall of cylindrical chamber 8, and in FIGURE 4 the line 29 supplies water to four water spray quench lines 32 extending radially into cylindrical quench section 34 of the furnace.

The operation of the furnace preferably proceeds by igniting the furnace. This may be done by removing one or both of pipes 24 temporarily and placing some burning crumbled newspapers or oily rags (not shown) in one or both of tunnels 23. The pipe or pipes are replaced and the oil or gas turned on, along with air through lines 32, and chamber 8 is filled with a spiral flame and/or hot combustion gases. Oil or gas make hydrocarbon is then introduced axially through pipe 18 into 8 in the center of the hot spiraling flame or gas from tunnels 23. If desired, gas 24 can then be cut off and the flame continued by burning a portion of make oil or gas from 18, or gas 24 can continue and the oil or make gas from 18 can be injected or sprayed into and through chamber 8 into primary reaction zone 9, being changed by partial combustion and/or pyrolysis into a carbon black smoke. A primary quenching occurs by water spray at 31, which slows down the reaction and reduces the total amount of reaction occurring in secondary reaction zone 33. Secondary quench 32 then brings the carbon black smoke down to a temperature below which substantially no further reaction occurs, and the smoke passes from quench zone 34 into a conventional gas solids separation zone 37, which may comprise a cyclone separator 37 (as shown) or a plurality of cyclones and/or a bag filter (not shown), any such system of the prior art being satisfactory. Samples of carbon black at 41, separated by cyclone 37 from the off gas in 38, are tested in standard rubber test samples to determine their 15- and/or 30-minute modulus, and then bolt 43 and nut 44 are adjusted to change the pressure at 45 by the amount necessary to change the modulus to the desired degree. Further samples of carbon black from 41 may be tested periodically to detect slow changes that occur and further check the modulus, and further adjustment of bolt 43 may then be made.

It has been found that in a furnace made as shown in the drawing with a 12-inch diameter reaction section 9 and sprays 31 and 32 a distance of 7 feet 6 inches apart, the 15-minute modulus increases 32.9 p.s.i. as the water pressure at 45 increases by 10 p.s.i., or an increase of 43.1 p.s.i. per increase of 1 gallon per minute of water injected into primary spray quench 31, the 30-minute modulus increases 16.7 p.s.i. as the water pressure at 45 increases 10 p.s.i., or an increase of 13.9 p.s.i. per increase of 1 gallon per minute of water in quench 31, the abrasion index increases only 0.91 percent as the water pressure at 45 increases 10 p.s.i., or 1.1 percent increase per increase of 1 gallon per minute of water spray 31, and the average decrease in surface area is only 0.25 square meter per gram for an increase of 10 p.s.i. at 45, or 0.59 decrease in square meter per gram for an increase of 1 gallon per minute in quench 31.

For different furnaces and different hydrocarbon make oils, or gas, the rate of change may vary, but as this process is empirical it makes no difference as one may determine by experiment what the results are for each furnace and for each oil, and then operate accordingly in the same manner as set forth above, using the new values found for the new furnace, or new oil or gas.

While specific examples and apparatus have been shown and described for purposes of illustration, obviously the invention is not limited thereto.

Having described our invention, we claim:

1. In a process for producing carbon black of a desired predetermined modulus by passing hydrocarbons and free oxygen-containing gas through a pyrolyzing zone and a quench zone, converting the hydrocarbons by pyrolysis in the pyrolyzing zone to carbon black smoke at a temperature at which a reaction continues that progressively reduces the modulus, and then quenching said reaction in said quench zone to set the modulus, the improvement comprising partially quenching said reaction at a constant predetermined rate at a first point in the upstream portion of said quench zone to the degree necessary to slow said reaction down to the extent necessary to produce a carbon black of the desired predetermined modulus when completely quenched at a second point in the downstream end of said quench zone spaced a sufficient distance downstream of said first point to permit said reaction to substantially reduce the modulus, and completely quenching said reaction at said second point to a temperature at which said reaction will not substantially change the modulus of the finally produced carbon black below said desired modulus.

2. In the process of claim 1, the additional steps of testing the modulus of said produced carbon black and adjusting the rate of flow of said cooling fluid to said first point to vary the modulus of said produced carbon black.

3. In a carbon black furnace having in series a partial combustion chamber, a quench chamber, quench means in said quench chamber, and an outlet for produced carbon black, there being hydrocarbon and free oxygen-containing gas inlets to said partial combustion chamber, the improvement comprising partial quench means comprising a conduit and a constant pressure downstream pressure-reducing regulating valve in said conduit disposed to inject a cooling fluid at a predetermined selected constant rate of flow into said quench chamber at a first fluid injection point in the upstream portion of said quench chamber, and complete quench means responsive to the temperature downstream thereof disposed to inject a cooling fluid at a second fluid injection point, spaced in said quench chamber a sufficient distance downstream from said first point to permit a substantial change in modulus to occur therein, and at a rate sufficient to maintain said temperature constant at a predetermined desired temperature.

4. The apparatus of claim 3 in which the partial quench means comprises a source of cooling fluid under pressure, a conduit connecting said source with said first fluid injection point, a constant pressure downstream pressure-reducing regulating valve in said conduit, said conduit having a fixed resistance to fluid flow from said valve to said first point, whereby the fluid is injected into the quench chamber at the first point at a constant rate of flow.

5. The combination of claim 4 in which the constant pressure downstream pressure-reducing regulating valve is provided with means to adjust the valve to produce a predetermined desired pressure in said conduit downstream of said valve and thereby adjust the constant rate of flow of cooling fluid to said first fluid injection point.

References Cited

UNITED STATES PATENTS

| | | | |
|---|---|---|---|
| 2,499,437 | 3/1950 | Wiegand et al. | 23—259.5 |
| 2,785,964 | 3/1957 | Pollock | 23—259.5 X |
| 2,971,822 | 2/1961 | Williams | 23—209.4 |
| 3,095,273 | 6/1963 | Austin | 23—209.6 |

OSCAR R. VERTIZ, *Primary Examiner.*

EDWARD J. MEROS, *Assistant Examiner.*